(12) United States Patent
Wang et al.

(10) Patent No.: US 7,096,534 B2
(45) Date of Patent: Aug. 29, 2006

(54) HINGE ASSEMBLY WITH ROTATING MECHANISM

(75) Inventors: Xiaozhou Wang, Shenzhen (CN); BaoJiang Chen, Shenzhen (CN); Chia-Hua Chen, Tu-Chen (TW)

(73) Assignee: FIH Co., Ltd., Shindian (TW)

( * ) Notice: Subject to any disclaimer, the term of this patent is extended or adjusted under 35 U.S.C. 154(b) by 2 days.

(21) Appl. No.: 10/863,078

(22) Filed: Jun. 7, 2004

(65) Prior Publication Data

US 2004/0261223 A1 Dec. 30, 2004

(30) Foreign Application Priority Data

Jun. 6, 2003 (TW) ............................... 92210425 U

(51) Int. Cl.
*E05C 17/16* (2006.01)

(52) U.S. Cl. ............................. 16/284; 16/342; 16/297; 16/335

(58) Field of Classification Search .................. 16/292, 16/297, 335, 336, 341, 342, 284
See application file for complete search history.

(56) References Cited

U.S. PATENT DOCUMENTS

| | | | | |
|---|---|---|---|---|
| 5,918,348 A | * | 7/1999 | Carpenter et al. | 16/342 |
| 6,035,491 A | * | 3/2000 | Hartigan et al. | 16/342 |
| 6,085,387 A | | 7/2000 | Han | |
| 6,119,310 A | * | 9/2000 | Ohshima et al. | 16/342 |
| 6,209,173 B1 | * | 4/2001 | Salter et al. | 16/342 |
| 6,523,224 B1 | * | 2/2003 | Oshima et al. | 16/335 |
| 6,817,064 B1 | * | 11/2004 | Kim et al. | 16/335 |
| 2004/0098833 A1 | * | 5/2004 | Lu et al. | 16/336 |

* cited by examiner

*Primary Examiner*—Chuck Y. Mah
*Assistant Examiner*—Michael J. Kyle
(74) *Attorney, Agent, or Firm*—Wei Te Chung

(57) ABSTRACT

A hinge assembly (1) includes a housing (10) encasing a rotating mechanism (30) and an elastic plate (40) therein, with an open end (12) of the housing being covered by an end cover (50). The rotating mechanism has a cam portion (32), and a connector (31) and a shaft (33) located at opposite ends of the cam portion. The connector rotatably extends through a hole (51) of the end cover. The rotating mechanism is rotatably engaged in the housing, with the shaft being rotatably received in a bushing (13) inside the housing. The cam portion has an arcuate cam surface (322) defining at least one flat surface (324) thereon. The elastic plate abuts between an inside wall of the housing and the arcuate surface. During rotation of a cover of a folding phone, the arcuate surface is rotatably engaged with the elastic plate until the elastic plate is positioned on the flat surface of the cam portion.

1 Claim, 4 Drawing Sheets

US 7,096,534 B2

HINGE ASSEMBLY WITH ROTATING MECHANISM

BACKGROUND OF THE INVENTION

1. Field of the Invention

The present invention relates to an apparatus for hinging together the housings of foldable devices, and particularly to an apparatus for hinging together the housings of a foldable mobile phone.

2. Description of Related Art

Portable radiotelephones having two housings joined by a type of hinge that allows the housings to fold upon one another are well known in the art. Some such folding radiotelephones have most of the electronics in one housing, called the main housing, and fewer electronics in the other housing, called the cover. Other such folding radiotelephones have all the electronics in the body, with the cover serving only to cover the keypad and/or the display of the radiotelenhone. Manufacturers have tried to reduce the volume, size and weight of portable radiotelephones. Thus, it is desirable that the hinge coupling the main housing with the cover is modularized and miniaturized. A modularized hinge is required to have a unified structure for holding moving parts of the hinge such as a cam member, a cam follower and a spring. For miniaturization, the size and the number of parts of the hinge should be reduced.

Such kind of hinge assembly is disclosed in U.S. Pat. No. 6,085,387, and is represented in FIG. 5 herein. The hinge assembly has a can 21, a first hinge member 22, a second hinge member 23, and a spring 24. The first hinge member 22, the second hinge member 23 and the spring 24 are inserted into the can 21 with an open end 217 of the can 21 being partially covered by way of bending protrusions 213 of the can 21. The first hinge member 22 is inserted through the open end 217 of the can 21 with a shaft 222 thereof extending trough a hole 211 of the can 21. The second hinge member 23 is inserted through the opene end 217 of the can 21 so that two protrusions 223 of the first hinge member 22 can be engaged with peaks 235 and valleys 236 of a cam portion 233 of the second hinge member 23, and a cylindrical guide column 234 is located between the two protrusions 223 for guiding the relative motion between the first and second hinge members 22, 23. The spring 24 exerts an elastic force on the second hinge member 23 to push the second hinge member 23 toward the first hinge member 22. However, the cylindrical guide column 234 may deviate from the rotating axis during rotation, and as a result, the second hinge member 23 cannot smoothly and stably move relative to the first hinge member 22. Furthermore, it is hard to keep the spring 24 move longitudinally, since there is no longitudinal support or guide member for fixing the spring 24. Thus the spring 24 can easily be damaged, and the second hinge member 23 cannot smoothly and stably move relative to the first hinge member 22.

Therefore, an improved structure of a hinge assembly which overcomes the disadvantages of the prior art is desired.

SUMMARY OF THE INVENTION

A main object of the present invention is to provide a hinge assembly having a reduced size.

Another object of the present invention is to provide a hinge assembly, wherein a relative motion of the moving parts thereof is smooth and stable.

A hinge assembly comprises a housing encasing a rotating mechanism and an elastic plate therein, with an open end of the housing being covered by an end cover. The rotating mechanism has a cam portion, and a connector and a shaft located at opposite ends of the cam portion. The connector rotatably extends through a hole of the end cover. The rotating mechanism is rotatably engaged in the housing, with the shaft being rotatably received in a bushing inside the housing. The cam portion has an arcuate surface defining at least one flat surface thereon. The elastic plate abuts between a wall inside the housing and the arcuate surface of the cam portion. During rotation of a cover of a folding phone, the arcuate surface is rotatably engaged with the elastic plate until the elastic plate is positioned on the flat surface of the cam portion.

Other objects, advantages and novel features of the invention will become more apparent from the following detailed description of a preferred embodiment thereof when taken in conjunction with the accompanying drawings, wherein:

DETAILED DESCRIPTION OF THE INVENTION

Figure 1:
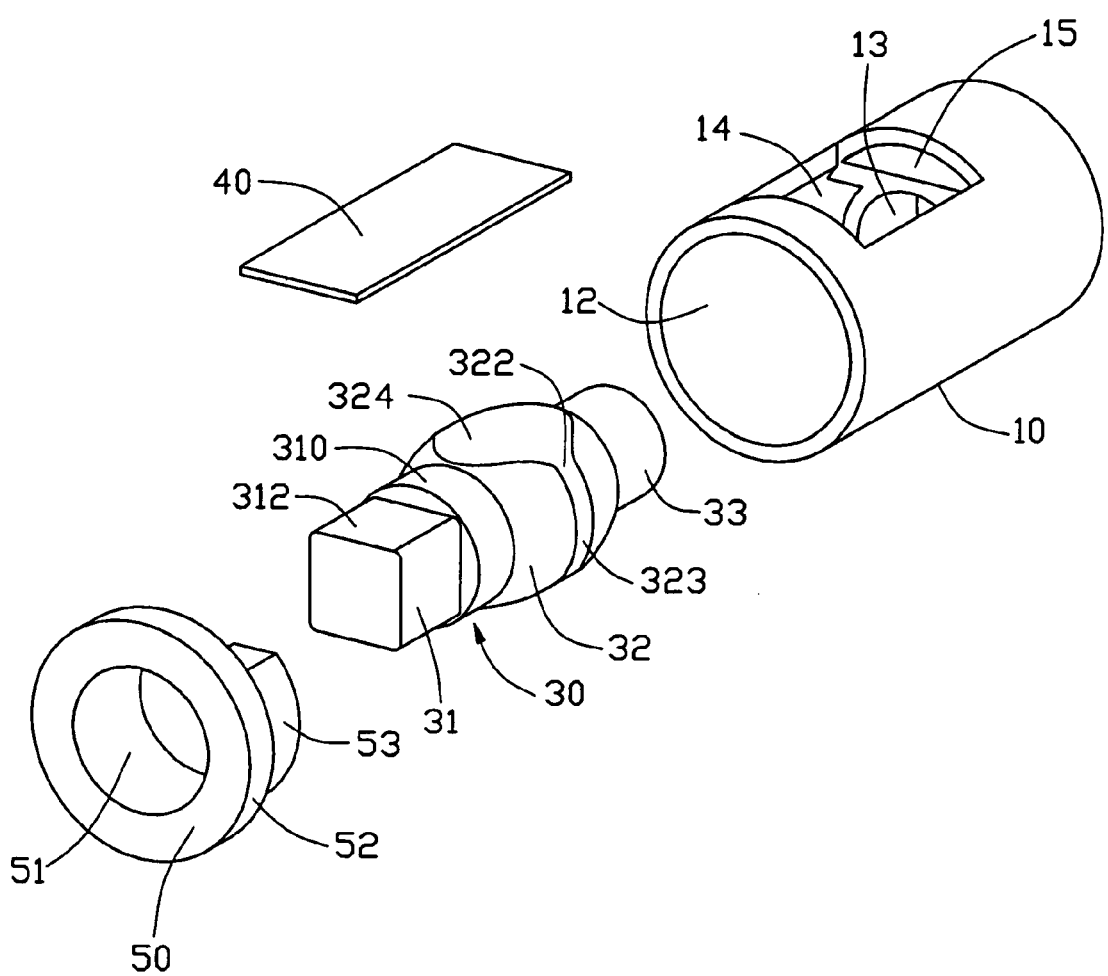
FIG. 1 is an exploded, perspective view of a hinge assembly in accordance with an embodiment of the present invention.

Referring now to the drawings in detail, FIG. 1 shows a hinge assembly 1. The hinge assembly 1 comprises a housing 10, a rotating mechanism 30, an elastic plate 40, and an end cover 50. The hinge assembly 1 is used to join a cover to a main body of a folding phone.

The housing 10, which substantially has a hollow cylindrical shape so as to define an interior space (not labeled) therein, is sealed at a rear end and is open at a front end thus forming an open end 12. An opening 14 is defined through a top wall of the housing 10, the opening 14 communicating with the interior space of the housing 10. A shaft bushing 13 is formed inside the housing 10 adjacent to the sealed end thereof. A support plate 15 extends inside the housing 10 from the sealed end thereof, being adjacent to the opening 14 and serving as a wall of the shaft bushing 13.

The rotating mechanism 30 has a cam portion 32, and a connector 31 and a shaft 33 located at opposite ends of the cam portion 32 and extending longitudinally. The cam portion 32 has an arcuate cam surface 322, which diametrically forms an arc crown 323 and two opposite flat surfaces 324. The arc crown 323 is located along a latitudinal direction of the cam portion 32 and communicates with the two flat surfaces 324. The two flat surfaces 324 are located 180 degrees from one another. In alternative embodiments, only one flat surface 324 or more than two flat surfaces 324 can be formed on the cam surface 322. The flat surfaces 324 are for engaging with the elastic plate 40 during rotation of the cover of the folding phone. The connector 31 has a cylindrical portion 310 adjacent to the cam portion 32. The connector 31 also has a polygonal portion 312, at an end opposite to the cam portion 32, for tightly engaging with the cover of the folding phone. The polygonal portion 312 may for example be cuboid. The shaft 33 is cylindrical, and has an outer diameter corresponding to an inner diameter of the shaft bushing 13 of the housing 10.

The elastic plate 40 is rectangular, and has a size greater than that of the opening 14.

The end cover 50 is substantially in a circular shape, and includes a first circular portion 52 and a second half circular portion 53. The end cover 50 defines a hole 51 therethrough corresponding to the cylindrical portion 310 of the connector 31. The outer diameter of the second half circular portion 53 is smaller than the inner diameter of the housing 10, so that the second half circular portion 53 can be inserted into the housing 10 and abut against a bottom wall inside the housing 10. The first circular portion 52 has an outer diameter not smaller than the inner diameter of the housing 10 so that the first circular portion 52 can abut against an outer fringe of the housing 10 at the open end 12.

Figure 2:
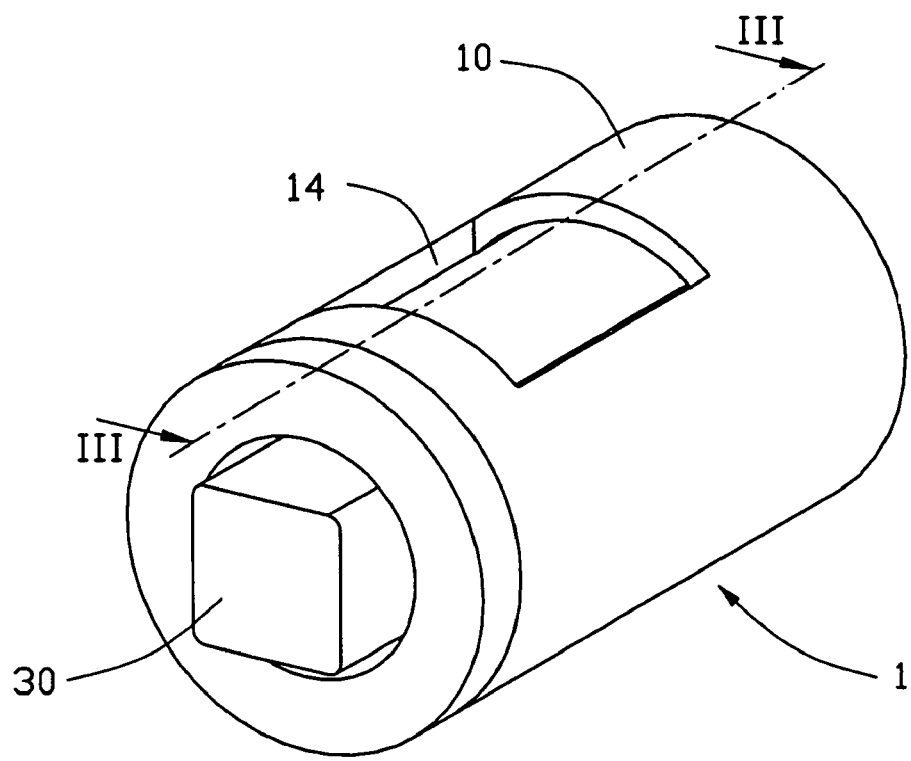
FIG. 2 is an assembled, perspective view of the hinge assembly of FIG. 1.
Figure 3:
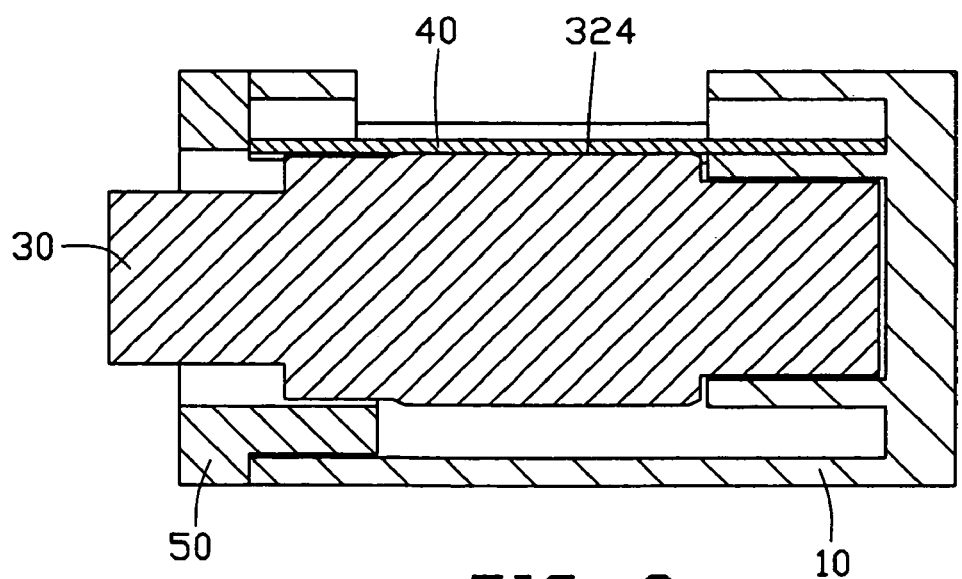
FIG. 3 is a cross-sectional view taken along a line III—III of FIG. 2 when the hinge assembly is in one position.

Referring to FIGS. 1–3, in assembly, the rotating mechanism 30, the elastic plate 40 and the end cover 50 are respectively inserted into the housing 10 through the open end 12 thereof. The shaft 33 is rotatably received in the shaft bushing 13. The second half circular portion 53 of the end cover 50 is inserted into the housing 10 and fits against the bottom wall inside the housing 10, the first circular portion 52 abuts the outer fringe of the housing 10 at the open end 12, and the end cover 50 is also rotatably inserted over the connector 31 with the polygonal portion 312 extending outside of the end cover 50 through the hole 51. The rotating mechanism 30 is supported between the end cover 50 and the shaft bushing 13 in the housing 10. One of the flat surfaces 324 of the cam surface 322 is located opposite to the bottom wall inside the housing 10, and the other flat surface 324 is located in front of the opening 14 of the housing 10. The elastic plate 40 is inserted between the opening 14 and the rotating mechanism 30, so that the elastic plate 40 fits against a top inside wall (not labeled) of the housing 10 under the opening 14 and is also engaged with the cam surface 322 of the rotating mechanism 30. The elastic plate 40 is supported by both a first flat surface 324 of the rotating mechanism 30 and the support plate 15 of the housing 10. One end of the elastic plate 40 terminates at the sealed end of the housing 10, and the other end of the elastic plate 40 terminates at a fringe of the first circular portion 52 of the end cover 50. Finally, the housing 10 is inserted into a tubular knuckle of the main body of the folding phone, and the polygonal portion 312 of the connector 31 is engaged in the cover of the folding phone.

Figure 4:
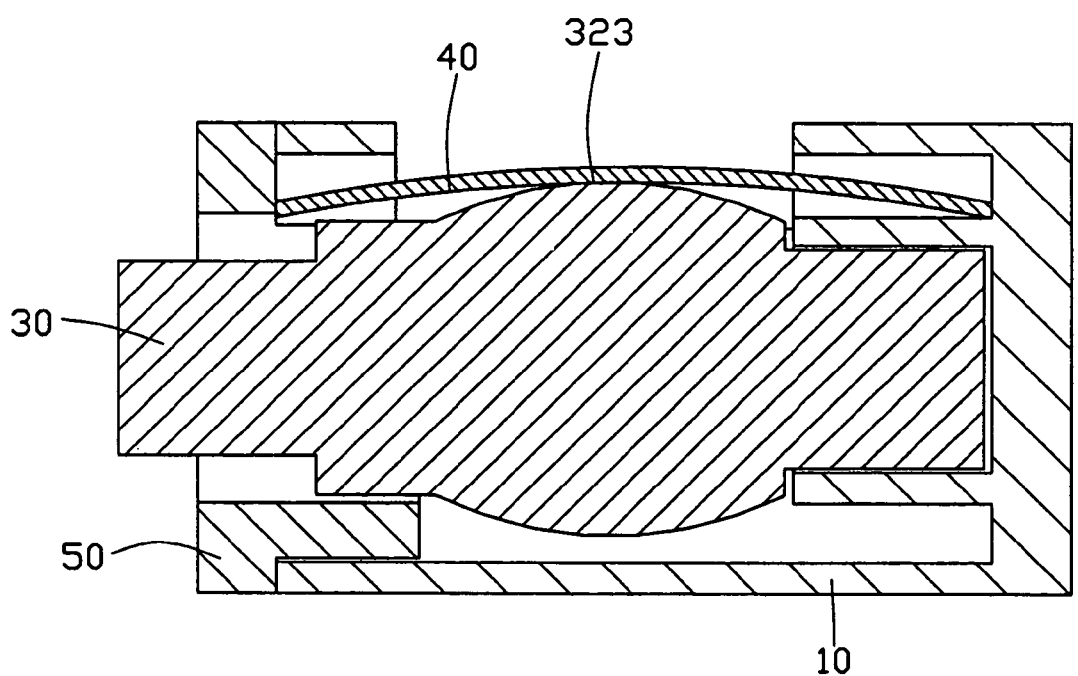
FIG. 4 is similar to FIG. 3, but showing the hinge assembly in another position.
Figure 5:
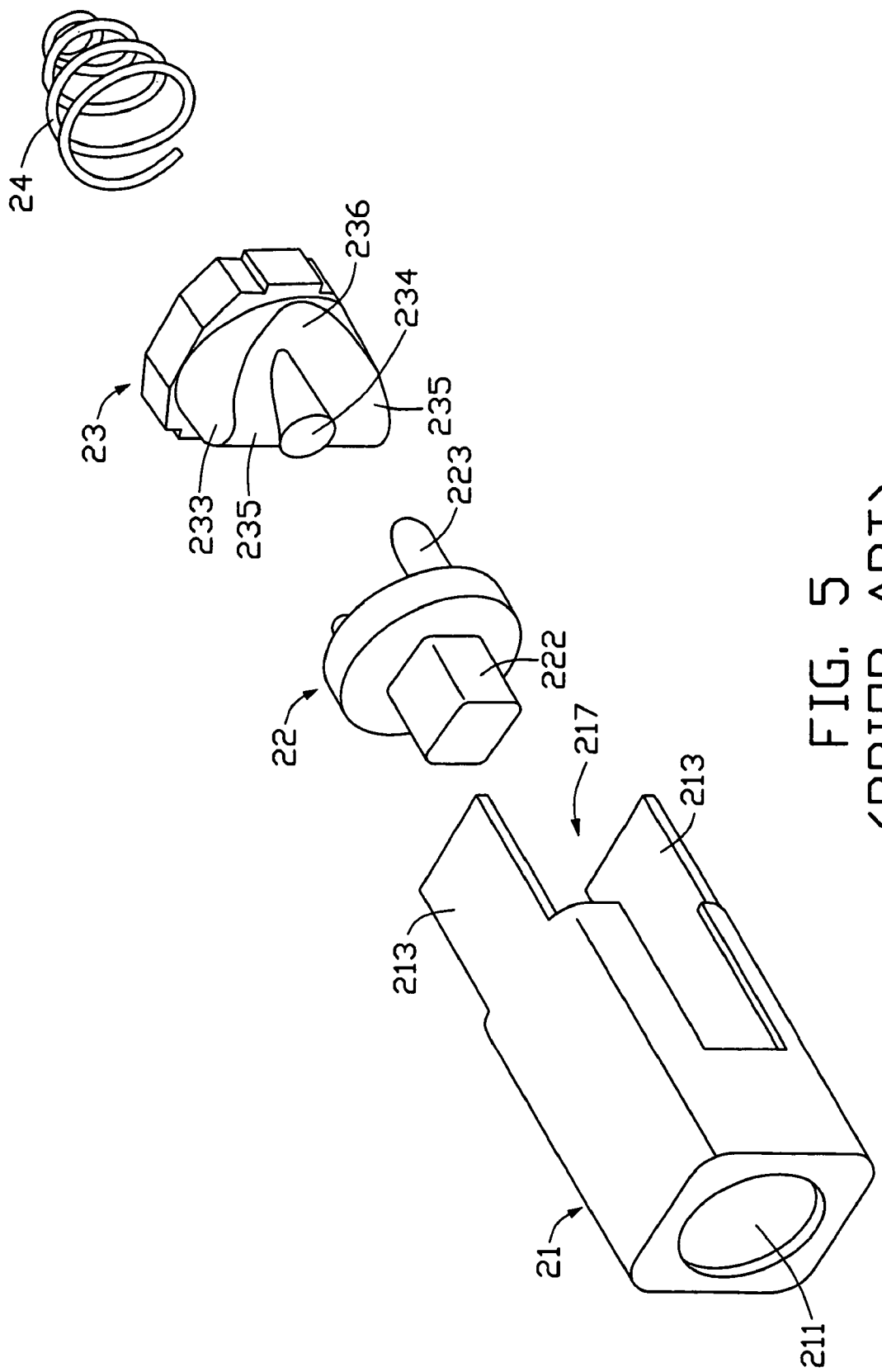
FIG. 5 is an exploded, perspective view of a hinge assembly of the prior art.

In use, when the cover of the folding phone rotates between an open position and a closed position, the rotating mechanism 30 rotates therewith, while the housing 10 with the elastic plate 40 therein remains relatively stationary. The cam portion 32 rotates relative to the elastic plate 40, allowing the arc crown 323 thereof to abut against the elastic plate 40, and thus the elastic plate 40 resiliently deforms toward the opening 14 of the housing 10 (see FIG. 4). The cam portion 32 is forced to further rotate under the elastic force of the elastic plate 40 until a second flat surfrce 324 abuts the elastic plate 40. Therefore the cover is open, with the first flat surface 324 of the cam portion 32 mating with the elastic plate 40; or the cover is closed, with the second flat surface 324 of the cam portion 32 mating with the elastic plate 40. If the cam portion 32 has only one flat surface 324 formed thereon, the elastic plate 40 engages with the flat surface 324 by passing over the arc crown 323, and thereby the folding phone is opened or closed. If the cam portion 32 has more than two flat surfaces 324 formed thereon, thereby the cover of the folding phone can be selectively opened to a few different angles. Since only one rotating mechanism 30 is used in the present invention, and two ends of the rotating mechanism are reliably fixed and guided, the hinge assembly is reduced in size and easily modulated, and the relative motion of the moving part of the hinge assembly 1 is stable.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A hinge assembly comprising:
a rotating mechanism having a cam portion, the cam portion having an arcuate cam surface, and the arcuate cam surface defining at least one flat surface thereon;
an elastic plate; and
a housing defining an interior space for encasing the rotating mechanism and the elastic plate therein;
wherein the rotating mechanism is rotatably engaged with the housing, the elastic plate abuts against both an inside wall of the housing and the arcuate cam surface for being positioned on the at least one flat surface of the cam portion, the rotating mechanism has a connector and a cylindrical shaft respectively located at opposite ends of the cam portion, the connector extends to an outside of the housing, the housing has an open end, the open end is covered by an end cover with the connector extending through a hole defined in the end cover, the connector comprises a cylindrical portion and a polygonal portion, the cylindrical portion is adjacent to the cam portion and the polygonal portion extends outside of the end cover, the end cover comprises a first circular portion and a second half circular portion, the first circular portion abuts against a fringe of the housing at the open end thereof, the second half circular portion abuts against a bottom wall inside the housing and opposite to the elastic plate, and the second half circular portion supports the rotating mechanism at one end thereof in the housing.

* * * * *